(12) United States Patent
Soerensen (10) Patent No.: US 11,859,595 B2
(45) Date of Patent: Jan. 2, 2024

(54) WIND TURBINE WITH A SAFETY SYSTEM HAVING A PLURALITY OF GAS OUTLETS

(71) Applicant: Siemens Gamesa Renewable Energy A/S, Brande (DK)

(72) Inventor: Johnny Soerensen, Videbaek (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/857,308

(22) Filed: Jul. 5, 2022

(65) Prior Publication Data

US 2023/0026470 A1 Jan. 26, 2023

(30) Foreign Application Priority Data

Jul. 19, 2021 (EP) .................................... 21186313

(51) Int. Cl.
| | | |
|---|---|---|
| *F03D 9/19* | (2016.01) | |
| *F03D 1/04* | (2006.01) | |
| *F03D 7/04* | (2006.01) | |
| *F03D 9/00* | (2016.01) | |
| *C25B 1/04* | (2021.01) | |
| *F03D 7/02* | (2006.01) | |
| *F03D 13/25* | (2016.01) | |
| *F03D 80/00* | (2016.01) | |

(52) U.S. Cl.
CPC .................. *F03D 9/19* (2016.05); *C25B 1/04* (2013.01); *F03D 1/04* (2013.01); *F03D 7/02* (2013.01);
(Continued)

(58) Field of Classification Search
CPC ................ F03D 9/19; F17C 2205/0176; F17C 2205/0332; Y02E 60/36; Y02E 10/70–76
See application file for complete search history.

(56) References Cited

U.S. PATENT DOCUMENTS

| | | |
|---|---|---|
| 5,592,028 A | 1/1997 | Pritchard |
| 2005/0000802 A1* | 1/2005 | Hobbs ...................... F17C 9/04 |
| | | 205/637 |

(Continued)

FOREIGN PATENT DOCUMENTS

| | | |
|---|---|---|
| JP | 2000238695 A | 9/2000 |
| KR | 20120038062 A | 4/2012 |

(Continued)

OTHER PUBLICATIONS

Harrison K. W. et al: "The Wind-to-Hydrogen Project: Operational Experience, Performance Testing, and Systems Integration"; USDOE; Mar. 1, 2009 ; XP055869915; DOI: 10.2172/951802 Retrieved from the Internet: URL:https://www.nrel.gov/docs/fy09osti/440.

(Continued)

*Primary Examiner* — Laert Dounis
(74) *Attorney, Agent, or Firm* — Schmeiser, Olsen & Watts LLP (57) ABSTRACT

A wind turbine is provided including a generator, an electrolytic unit, a system inlet and a system outlet, wherein the electrolytic unit is electrically powered by the generator to produce hydrogen from an input fluid, in particular water, wherein the hydrogen produced can be taken out of the wind turbine by the system outlet, wherein the wind turbine further includes a safety system controlled by a control unit configured to evacuate the hydrogen out of the wind turbine) by a plurality of gas outlets distributed on a platform of the wind turbine and configured to release the hydrogen to the atmosphere.

13 Claims, 7 Drawing Sheets

(52) U.S. Cl.
CPC .............. *F03D 7/04* (2013.01); *F03D 9/00* (2013.01); *F03D 13/25* (2016.05); *F03D 80/00* (2016.05); *F05B 2220/61* (2013.01); *F05B 2270/107* (2013.01); *F17C 2205/0176* (2013.01); *F17C 2205/0332* (2013.01); *Y02E 10/72* (2013.01); *Y02E 60/36* (2013.01)

(56) References Cited

U.S. PATENT DOCUMENTS

| | | |
|---|---|---|
| 2016/0377342 A1 | 12/2016 | Mermelstein |
| 2018/0202053 A1* | 7/2018 | Harano ............... H01M 8/0656 |

FOREIGN PATENT DOCUMENTS

| | | | | |
|---|---|---|---|---|
| WO | WO-2017151035 A1 * | 9/2017 | ............... | C02F 7/00 |
| WO | 2020095012 A1 | 5/2020 | | |

OTHER PUBLICATIONS

Nss: "National Aeronautics and Space Administration Safety Standard for Hydrogen and Hydrogen Systems Guidelines for Hydrogen System Design, Materials Selection, Operations, Storage, and Transportation"; Jul. 25, 2005; XP055869935; Retrieved from the Internet: URL:https://www.energy.gov/sites/default/files/2014/03/f11/871916.pdf.

* cited by examiner

WIND TURBINE WITH A SAFETY SYSTEM HAVING A PLURALITY OF GAS OUTLETS

CROSS-REFERENCE TO RELATED APPLICATIONS

This application claims priority to EP Application No. 21186313.9, having a filing date of Jul. 19, 2021, the entire contents of which are hereby incorporated by reference.

FIELD OF TECHNOLOGY

The following relates to a wind turbine comprising a safety system. The following further relates to a method of operating the wind turbine.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. In an embodiment, the rotational energy of the blades is transferred to the generator, which then converts the mechanical energy into electricity and transfers the electricity to the electrical grid.

Wind turbines are placed at locations providing high wind amounts. These locations can be remote onshore locations or offshore locations on the sea. For the transportation of the electrical energy, the power generated by the generator of the wind turbine travels to a transmission substation of the wind farm, where it is converted to high voltage, usually between 130-765 kV, for long distance transmission on the transmission grid over power lines. The transmission grid connects the remote location of the wind farm to a transformer station of the electrical grid, which transforms the electricity to a voltage compatible with the electrical grid.

A problem of remote wind farms is that the distance between the wind farm and the transformer station of the electrical grid needs to be bridged. Long power lines with very high installation costs are required.

The current development of the technology of wind turbines tends to an increased size of wind turbines for harvesting more wind energy, with longer blades and higher towers. Due to the increasing size of wind turbines, more power is supplied to the grid which is to be transported from the wind farm to the nearest input point of the grid. Increasing the power transferred over the long-distance power lines results in higher requirements for the cables and higher costs.

To reduce the amount of energy transferred by the power lines of the transmission grid or to avoid the use of long-distance power lines completely, an electrolytic unit can be installed in the vicinity of the wind turbine. A wind turbine comprising an electrolytic unit generates electrical power by the generator and hydrogen by the electrolytic unit driven by at least a part of the power of the wind turbine.

Electrolytic units are power-to-gas units configured to produce hydrogen. In an embodiment, the energy produced by the wind turbine may be used in an electrolysis process to generate hydrogen and oxygen. These gases can be used afterwards for the generation of electrical energy in fuel cells or to produce chemicals, such as ammonia or methane. The produced gases from the electrolytic unit can be transported by using a pipeline or by pressurizing the gas into a container, which is less expensive than transporting electricity directly over long-distance power lines.

The use of electrolytic units in combination with wind turbines is known from the conventional art, for example in the document U.S. Pat. No. 5,592,028 A, where a plurality of electrolysis cells are connected to a wind farm and produce hydrogen by the electricity produced by the generators of the wind turbines. Similarly, the document WO 2020/095012 A1 describes an offshore wind turbine system for the large-scale production of hydrogen, which includes a floating tower structure with a desalination unit and an electrolysis unit.

In a wind farm with an electrolytic unit, the situation might arise when due to a failure in the power-to-gas unit, in the gas storage equipment or in the wind turbine in general, the wind turbine needs to be inspected by a technician to locate where the problem originates. Other situations where the system is to be inspected by a technician arise during regular maintenance works. In such cases, the gas in the wind turbine and, in particular, in the electrolytic unit, has to be evacuated from the wind turbine due to safety reasons for the technician to operate.

The flammability of gaseous hydrogen combined with the potential that leaked hydrogen may become trapped within the interior of the wind turbine leads to a risk of a hydrogen-related fire or explosion when the wind turbine is used for the production of hydrogen. This is both a commercial and safety risk, as hydrogen may not only damage the wind turbine itself but is also odorless and generally undetectable by personnel who might unknowingly be working in an explosive environment. In an embodiment, hydrogen leakages mixing with the oxygen in the air might result in an explosive mixture and a small spark of the electrical equipment might result in an explosion.

SUMMARY

An aspect relates to a wind turbine with a safety system which mitigates the risks associated with the production of hydrogen, in particular if technicians are operating on-site.

According to embodiments of the invention, a wind turbine comprises a generator, an electrolytic unit, a system inlet and a system outlet, wherein the electrolytic unit is electrically powered by the generator to produce hydrogen from an input fluid, in particular water, wherein the hydrogen produced can be taken out of the wind turbine by the system outlet.

In an embodiment, the generator generates electric power and supplies the electrolytic unit with at least a part of the power generated, as both components are electrically coupled.

Due to the fluctuation of the power generation, depending for example on weather conditions and wind levels, it is difficult to foresee the power output of an offshore wind turbine to the electricity grid or to an energy storage device. By using a part of the energy produced by the generator to produce hydrogen, the fluctuations can be mitigated. The hydrogen can be taken out of the wind turbine by a system outlet coupled to the output of the electrolytic unit.

At least a part of the energy produced by the generator can be used to power an electrolytic unit, so that the electricity grid is not overloaded by peaks of power generation of the fluctuating power generation facility. Additionally, if a problem in the output to the electricity grid occurs, the power can be redirected completely to the electrolytic unit so that only hydrogen, is produced. The hydrogen produced is usually in a gaseous state, which can be compressed and/or mixed with other components to a liquid state which is easier to store and/or transport.

The electrolytic unit can also be a mixed gas generator which performs electrolysis and generates other gases. For example, the electrolytic unit can perform electrolysis on water and carbon dioxide to generate a mixed gas made of hydrogen and carbon monoxide. Alternatively, hydrogen can be mixed with natural gas, which increases the hydrogen/carbon ratio of the hydrogen and gives it a flame speed up to eight times higher than compressed natural gas.

According to embodiments of the invention, the wind turbine further comprises a safety system controlled by a control unit configured to evacuate the hydrogen out of the wind turbine by a plurality of gas outlets distributed on a platform of the wind turbine and configured to release the hydrogen to the atmosphere.

By the safety system, the hydrogen can be evacuated from the components and modules of the wind turbine containing hydrogen before technicians or other personnel enter the wind turbine, thereby reducing the risk of formation of explosive air-hydrogen-mixtures and the injuries to any person at the location of the wind turbine. The hydrogen evacuation of the electrolytic unit prevents explosive mixtures of oxygen and hydrogen from building up in the pipe network and at the modules of the wind turbine.

The gas outlet location may be on the platform where the electrolytic unit is arranged, but also on the tower or on the nacelle.

The gas outlet location can be based on the density of the gases or the gas mixtures to be evacuated, e.g., hydrogen, methane, and ammonia gas will rise due to their lower density, whereas heavier gases will sink.

One of the criteria for choosing a gas outlet location is to take into consideration that the gas flow should occur in a direction away from people, i.e., away from pathways where technicians might stay and away from the wind turbine platform.

Another criteria for choosing a gas outlet location is to take into consideration that the gas flow should occur in a direction away from electrical equipment to avoid any possible fires, such as the generator, switches, computers, etc.

The gas outlets are distributed over the platform area, at the corners or sides of the platform. The gas outlets are arranged at an angular distance with respect to the tower of the wind turbine. In an embodiment, the angular distance between two gas outlets is at least 90°. Optimally, four gas outlets are distributed at the edge of the platform at an angular distance of about 90° from the neighboring gas outlets.

By the control unit, the plurality of gas outlets can be opened in such a way that the gas evacuated is carried away by the wind without stagnating in the area of the platform to reduce the risk of explosions. In an embodiment, by having a plurality of gas outlets, the gas outlets in the rear part of the platform relative to the wind direction can be opened and the wind will carry the evacuated gas away from the platform.

In an embodiment, the wind turbine can be evacuated by the safety system by opening the gas outlets which will carry the hydrogen both in the direction of the wind and away from the platform. With this measure, the flow of the hydrogen over the platform area is avoided. Additionally, if a gas is produced with a higher density than air, with this measure the risk of gas building up at the platform area, i.e., between the containers, is minimized. Examples of higher density gases are propane or butane, which can be formed in small amounts during the conversion of hydrogen into methane or through a device by converting the generated hydrogen to these gases.

According to an embodiment of the invention, the control unit controls the flow through the gas outlets depending on whether the gas outlet is located at a windward direction or at a leeward direction with respect to the platform for avoiding that the hydrogen spreads over the region of the platform.

The control unit can automatically trigger a hydrogen evacuation of the electrolytic unit when people approach the wind turbine or due to the detection of any potentially damaging event occurring due to a malfunction of the hydrogen production system. By such safety system, it is particularly possible to avoid that such malfunction, which can lead to an accumulation of hydrogen within the wind turbine system, results in an ignition of such hydrogen and thus in substantial damage to the system. Such safety system can in particular be configured to ensure that the hydrogen concentration within the wind turbine system stays below a flammable or an explosive limit. The detection of a malfunction can be set up to trigger an alarm.

Similarly, the control unit can be manually triggered to evacuate the electrolytic unit, particularly before a service or maintenance task, for example by receiving a triggering signal.

A remotely triggered hydrogen evacuation enables to evacuate the wind turbine prior to a service technician entering the wind turbine facility. This ensures a safe operation of technicians on the wind turbine.

According to an embodiment of the invention, the gas outlets in the windward direction are closed and at least one of the gas outlets in the leeward direction is opened. This control strategy minimizes the risk of explosions and injuries, as it avoids that explosive air-hydrogen-mixtures build up in the platform region.

In an embodiment, the gas outlets which are first reached by the wind following the wind direction are closed to avoid an evacuation of hydrogen through these gas outlets. Else, the wind direction would carry the hydrogen directly over the platform.

According to an embodiment of the invention, the gas outlets comprise a funnel with an opening, wherein the opening of the funnel is also configured as an air inlet for introducing air into the electrolytic unit and enhancing the evacuation of the hydrogen.

By an appropriate control strategy, the funnels can act as an air inlet and thus collect and transport air into the electrolytic unit, or as a gas outlet to release the hydrogen of the electrolytic unit in the atmosphere. The transport of air collected by the funnels through the electrolytic unit enhances the hydrogen evacuation process, as air pushes the hydrogen out of the electrolytic unit in a faster and efficient manner.

Wind turbines are placed at locations providing high wind amounts for maximizing the electricity output of the wind turbine. In an embodiment, the collection of air through the funnels is particularly easy at these locations.

According to an embodiment of the invention, the control unit controls the gas outlets in such a way that the funnel or the funnels in the windward direction with respect to the platform act as an air inlet, wherein the hydrogen is evacuated through at least one of the gas outlets in the leeward direction.

As the funnels can act as an air inlet and given that many wind turbines are placed at locations with high wind amounts, the funnel or the funnels facing the wind can collect air which is used to push the hydrogen out of the electrolytic unit and into the atmosphere through the rest of the funnels, which act as gas outlets.

According to an embodiment of the invention, at least one gas outlet is arranged at the upper part of a chimney. In an embodiment, each gas outlet of the safety system is arranged at the upper part of a chimney.

As hydrogen is lighter than air, the hydrogen concentration in the electrolytic unit can be lowered efficiently by opening the gas outlet, as hydrogen will automatically raise and leave the electrolytic unit.

The chimney can be located at the corner of the platform where the electrolytic unit is arranged to ensure that the gas is transported away from electrical components of the electrolytic unit or of the wind turbine in general. A chimney can be coupled to each component of the wind turbine where the hydrogen is stored and/or transported, in particular the components comprised in the electrolytic unit or components forming part of any hydrogen treatment unit, such as a hydrogen transformation unit where hydrogen is transformed into other gaseous products such as ammonia or methane.

The height of the chimney can be restricted as not to interfere or collide with the rotating blades of the wind turbine.

The chimney can be stabilized with a wire support to withstand the wind shear.

According to an embodiment of the invention, the hydrogen can be evacuated through the system outlet in particular by a pump or by opening a system outlet valve. This measure can be used in addition to other measures for hydrogen evacuation for a faster and more efficient hydrogen evacuation process.

According to an embodiment of the invention, the safety system is configured to release an overpressure in the electrolytic unit, in particular by opening the system outlet valve or by releasing the hydrogen to the atmosphere through the gas outlet.

In an embodiment, the pressure in the electrolytic unit can be regulated through the safety system. This is an additional safety measure which lowers the risk of explosion and the risk of damage at the containers and pipes due to an overpressure in the electrolytic unit.

According to an embodiment of the invention, the safety system comprises gas detectors to monitor the leakage of hydrogen or to monitor if the hydrogen has been evacuated completely. This minimizes the risk of injuries to workers.

The gas detector may be arranged within the electrolytic unit or on the platform, but also on the tower or on the nacelle of the wind turbine. In an embodiment, it is arranged in an upper part of the respective system. As hydrogen generally rises, the sensitivity of the control unit may thereby be improved. The at least one gas detector may include hydrogen sensors of one type or of different types, wherein types of hydrogen sensors for example include a MOSFET-type sensor, an electrochemical sensor, a catalytic sensor, a thermal conductivity sensor, and/or metal oxide sensors. The control unit may include one or a combination of additional sensors, for example a flame detector, a spark detector, a smoke detector, and the like. These may be provided in addition to the gas detector and may further improve the safety of the wind turbine by being able to quickly detect a source of ignition.

According to an embodiment of the invention, the control unit monitors the wind direction and/or the wind speed. This is advantageous to know when and through which gas outlets should the hydrogen be evacuated to avoid gas building up at the platform area.

According to an embodiment of the invention, the safety system comprises a fan configured to enhance the transport of the evacuated hydrogen away from the platform.

For situations where the wind is not strong enough and the risk of gas building up at the platform area is high, an electrical fan is an advantageous measure to carry the evacuated gas away from the platform area.

According to an embodiment of the invention, the gas outlets are rotatable and configured to be aligned with the wind direction.

The funnels and/or gas outlets are rotatable to maximize the air collected by the air inlet of the funnels and/or to align the gas outlets to the wind direction so that the wind efficiently carries the hydrogen away from the platform area.

According to an embodiment of the invention, the safety system comprises a distributor system for collecting the hydrogen.

The distributor system can be a manifold system, so that valves controlling the opening and closing of the individual gas outlets are controlled according to the wind direction.

The distributor system can be connected to the individual electrolytic devices through a piping system so as to collect the produced hydrogen.

The distributor system can perform self-test procedures, i.e., the pipes used to collect any escaping gas can be pressurized by e.g., air to check for pressure drops, hence indicating a leakage.

The distributor system allows to release the hydrogen through a gas outlet depending on its location on the wind turbine, thereby preventing the release of hydrogen over the platform area.

According to another embodiment of the invention, the safety system comprises a leakage detector configured to detect a leakage of hydrogen. In an embodiment, a malfunction of the electrolytic unit can be detected by the leakage detection. The leakage detector can comprise a hydrogen gas sensor, wherein a malfunction of the electrolytic unit is detected if a hydrogen concentration detected by the hydrogen gas sensor is above a predetermined threshold. Such configuration allows a fast and efficient detection of the onset of a dangerous situation in the wind turbine; it in particular allows a triggering of the hydrogen evacuation from the electrolytic system prior to the occurrence of dangerous hydrogen concentrations. In other implementations, the leakage detector may comprise an ultrasonic detector, by which a malfunction in form of a leakage may be detected, upon which the hydrogen evacuation may be triggered.

Yet another aspect of embodiments of the invention relate to a method of operating a wind turbine comprising the steps of
  opening at least one of the gas outlets, and
  releasing the hydrogen to the atmosphere through the gas outlet.

According to another aspect of embodiments of the invention, the method comprises the steps of:
  detecting the wind direction before opening at least one of the gas outlets,
  leaving the gas outlets in the windward direction with respect to the platform closed, and
  opening at least one of the gas outlets in the leeward direction.

According to another aspect of embodiments of the invention, the gas outlets comprise a funnel with an opening, wherein the opening of the funnel is also configured as an air inlet for introducing air into the electrolytic unit and enhancing the evacuation of the hydrogen. The method comprises the steps of:

detecting the wind direction before opening at least one of the gas outlets, opening at least one of the gas outlets comprising the funnel in the windward direction with respect to the platform in such a way that the funnel in the windward direction acts as an air inlet, and opening at least one of the gas outlets in the leeward direction so that the hydrogen is evacuated.

According to another aspect of embodiments of the invention, the hydrogen evacuation process and/or the purging is triggered automatically by the approach of a vessel to the wind turbine.

The safety system can be linked to an AIS, an Automatic Identification System, used for locating and identifying vessels close to the wind turbine or the wind park. The automatic triggering of the hydrogen evacuation process can be conducted when a vessel approaches the wind turbine or the wind park at a specific distance to be set at the control unit.

According to another aspect of embodiments of the invention, an alarm is triggered during the hydrogen evacuation process. This notifies workers of the hydrogen evacuation process so that security measures can be taken not to approach the wind turbine or the gas outlets until the hydrogen evacuation process is finished.

Additionally, the alarm may be configured such that it indicates that an elevated concentration of gaseous hydrogen is present at the platform area, which might be detected by the gas detectors. Such alarm may include an audible alarm within the wind turbine, which is distinct from other audible alarms, such as fire alarms. Accordingly, personnel within the wind turbine can be informed of the potentially hazardous situation. The alarm may additionally or alternatively include a visual alarm having a warning light of a predetermined color and/or a predetermined timing pattern that is associated with an elevated hydrogen concentration. The alarm may also be communicated to an operator via a communication connection, so that a remote operator is informed about the situation and the malfunction. The type of alarm may depend on the safety function trigger. Different alarms might be triggered depending on the hydrogen concentration at the platform region, which might differ in sound, color, pattern or other alarm types. The type of alarm can thus indicate how high the detected hydrogen concentration is.

According to another aspect of embodiments of the invention, the hydrogen evacuation process is automatically triggered in the case of fire at the wind turbine. By having a plurality of gas outlets, the gas outlets which are the furthest from the fire location can be opened taking into account the wind direction so that the gas is evacuated at a safe distance from the fire.

According to another aspect of embodiments of the invention, the hydrogen evacuation process is automatically triggered in the case of a hydrogen leakage at the wind turbine. This can be monitored by gas sensors.

According to another aspect of embodiments of the invention, the hydrogen of the wind turbine is automatically evacuated after periods of time of a specific length when the wind turbine is not be operated. These are stand still periods, for example caused due to maintenance or service repairs or due to adverse weather conditions.

According to another aspect of embodiments of the invention, the hydrogen is evacuated from the wind turbine during the start-up procedure of the wind turbine. As during start-up, hydrogen-oxygen mixtures can build up due to the low level of hydrogen and the high level of oxygen in the system, by evacuating the hydrogen from the system until enough hydrogen is generated by the electrolytic unit, the risk of building explosive mixtures is reduced.

BRIEF DESCRIPTION

Some of the embodiments will be described in detail, with reference to the following figures, wherein like designations denote like members, wherein.

DETAILED DESCRIPTION

Figure 1:
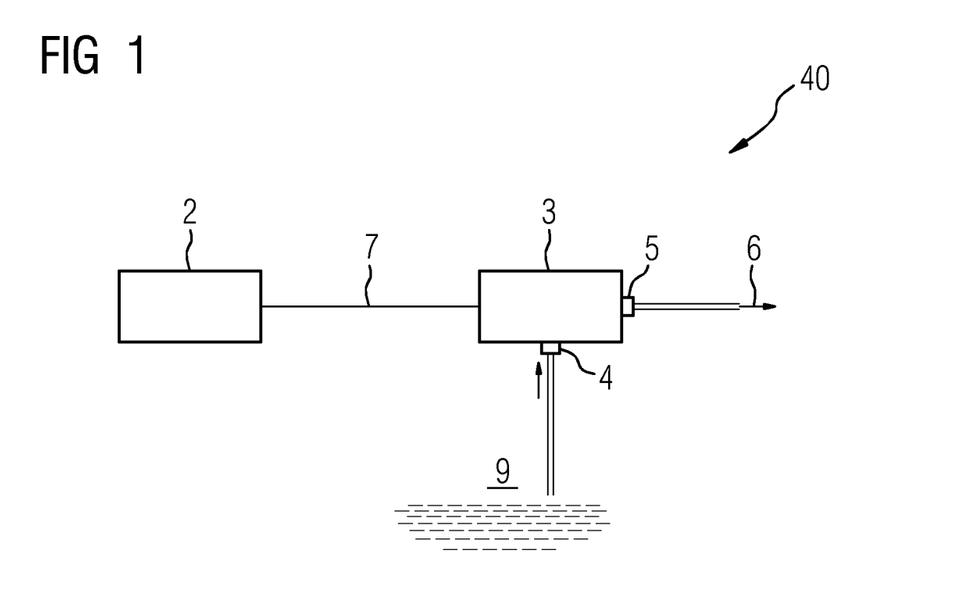
FIG. 1 shows a schematic view of a wind turbine, wherein the power produced by the generator is completely transferred to the electrolytic unit.

FIG. 1 shows a schematic view of a wind turbine 40, wherein the power produced by the generator 2 is completely transferred to the electrolytic unit 3.

The generator 2 is coupled to the electrolytic unit 3 by an electric connection 7.

The electrolytic unit 3 comprises a system inlet 4 and a system outlet 5. The electrolytic unit 3 is electrically powered by the generator 2 to produce hydrogen 6. To produce the hydrogen 6, water as the input fluid 9 enters through the system inlet 4 of the electrolytic unit 3 and is then transformed to hydrogen 6 in the electrolytic unit 3 by electric power coming from the generator 2. The hydrogen 6 exits the electrolytic unit 3 by the system outlet 5.

Figure 2:
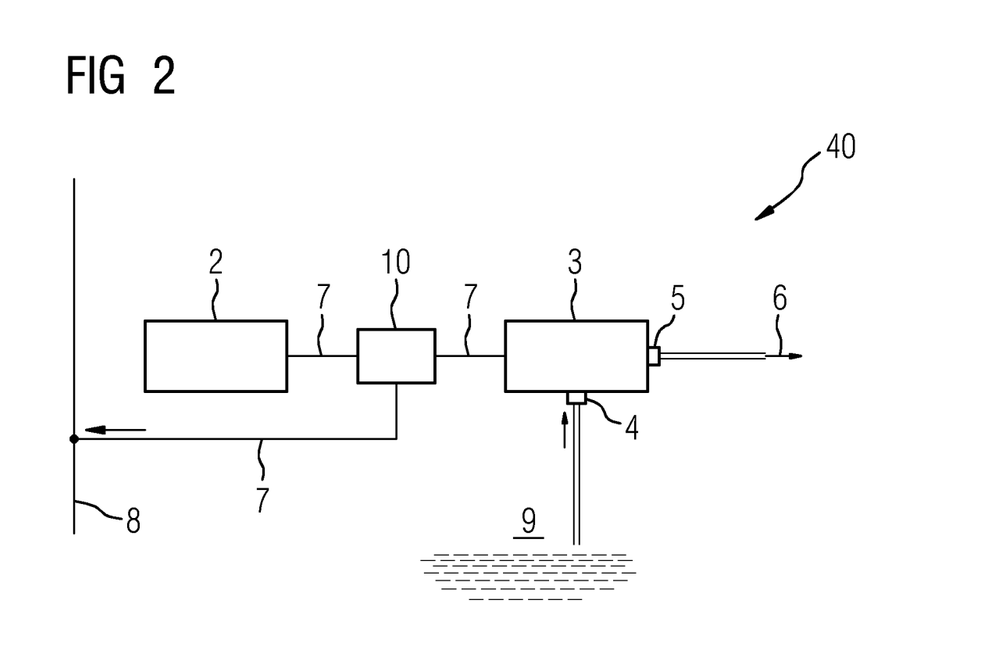
FIG. 2 shows a schematic view of a wind turbine, wherein the power produced by the generator is transferred to the electricity grid and to the electrolytic unit.

FIG. 2 shows a schematic view of a wind turbine 40, wherein the power produced by the generator 2 is transferred to the electricity grid 8 and to the electrolytic unit 3. The electrolytic unit 3 works in the same way as shown in FIG. 1.

A power controlling device 10 is added in the electric connection 7 between the generator 2 and the electrolytic unit 3 to distribute the electric power between the generator 2 and the electrolytic unit 3 and between the generator 2 and the electricity grid 8. In an embodiment, the amount of electric power can be varied depending on the demand for electric power and/or hydrogen 6.

Figure 3:
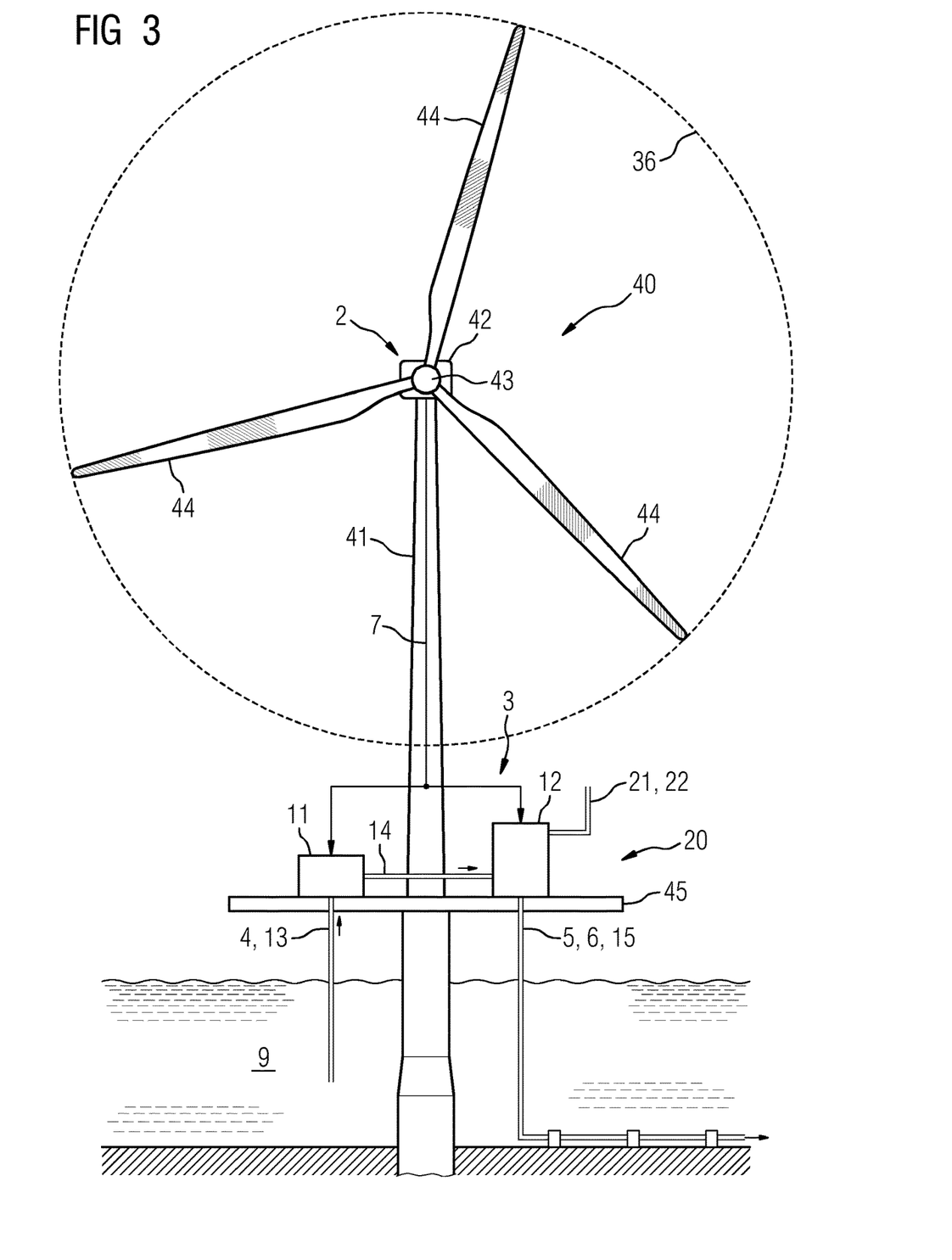
FIG. 3 shows a schematic view of a wind turbine comprising a safety system.

FIG. 3 shows a schematic view of a wind turbine 40 comprising a safety system 20. In an embodiment of the invention, the power produced by the generator 2 is completely transferred to the electrolytic unit 3. The electrolytic unit 3 comprises a desalination unit 11 and an electrolytic device 12, as well as a fluid connection between the desalination unit 11 and the electrolytic device 12. The electrolytic device 12 and the desalination unit 11 are both powered by the generator 2, which is connected to both devices by an electric connection 7.

The input fluid 9 for the electrolytic unit 3 is saltwater taken of the sea of the offshore wind turbine. In an embodiment, the system inlet 4 is a saltwater input 13, where saltwater enters the wind turbine 40. The saltwater enters the desalination unit 11 and the output of the desalination unit 11 is desalinated water 14. The desalinated water 14 is then introduced in the electrolytic device 12.

Through the system outlet 5 of the wind turbine 40, hydrogen 6 is taken out of the system through a hydrogen output 15, as seawater is used as the input fluid 9.

The wind turbine 40 comprises a tower 41 on top of which a nacelle 42 is rotatably mounted. The wind turbine 40 further comprises a hub 43 which is connected to the nacelle 42. A plurality of blades 44 are mounted on the hub 43. The hub 43 is connected to a rotor and is rotatably mounted about a rotor axis by a main bearing. The area through which the blades 44 spin, as seen when directly facing the center of the blades 44, is the swept area 36. The wind turbine 40 further comprises a platform 45 on which the electrolytic unit 3 is arranged.

In an embodiment of the invention, the safety system 20 of the wind turbine 40 is coupled to the electrolytic device 12 of the electrolytic unit 3. The safety system 20 comprises a gas outlet 21 at a chimney 22, thereby providing for an opening through which hydrogen 6 and other gases can be evacuated out of the electrolytic unit 3.

Figure 4:
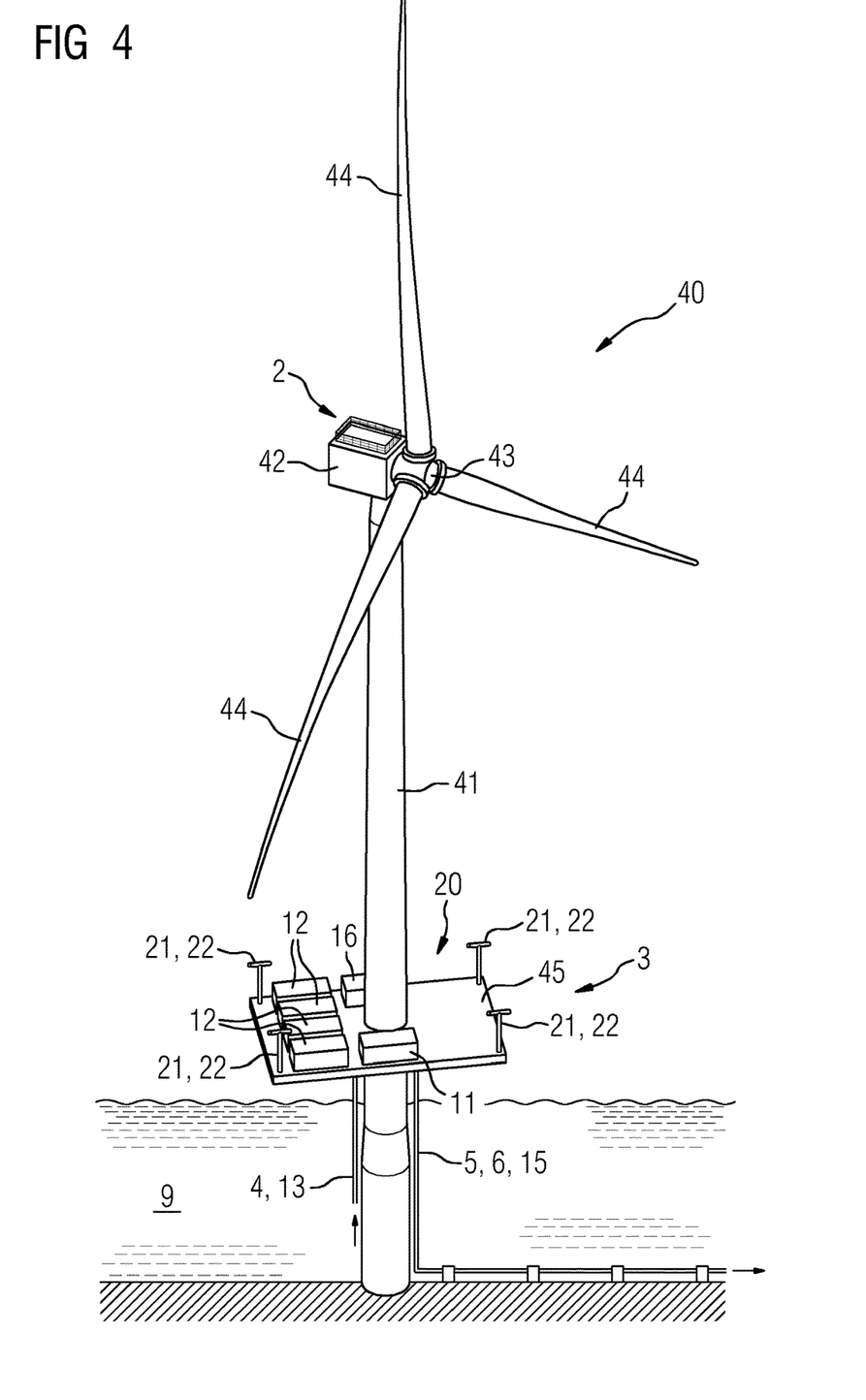
FIG. 4 shows another embodiment of a wind turbine comprising a safety system.

FIG. 4 shows another embodiment of a wind turbine 40 comprising a safety system 20. In this embodiment, the electrolytic unit 3 is arranged on the platform 45 of the wind turbine 40. The electrolytic unit 3 comprises four electrolytic devices 12, a desalination unit 11 and electrical equipment 16, such as control units or power converters, arranged in containers. The safety system 20 is arranged at four different corners of the platform 45. The safety system 20 comprises a gas outlet 21 at a chimney 22 at each of the corners of the platform 45 where the safety system 20 is installed.

Figure 5:
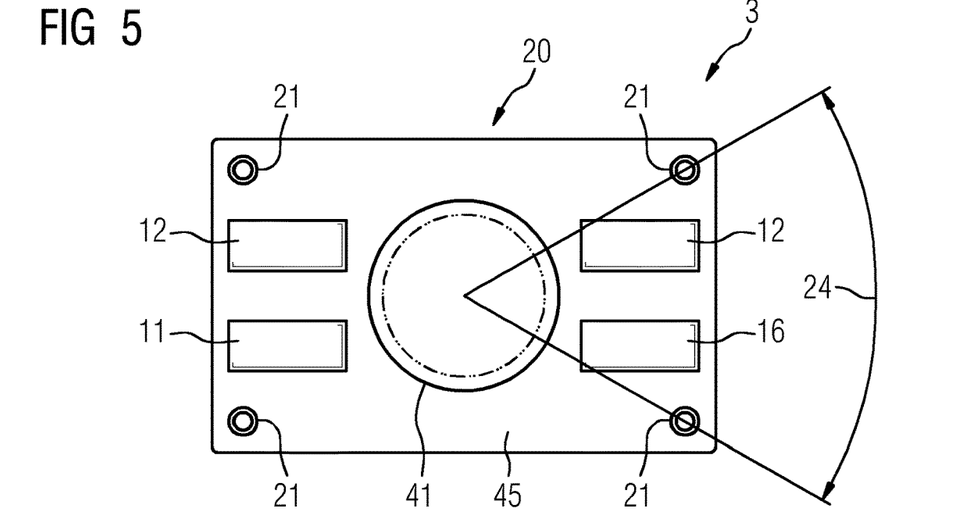
FIG. 5 shows a schematic view of a possible arrangement of the components comprised in a safety system on a platform of a wind turbine.

FIG. 5 shows a schematic view of a possible arrangement of the components comprised in a safety system 20 on a platform of a wind turbine. In this embodiment, the electrolytic unit 3 is arranged on the platform 45 of the wind turbine 40. The electrolytic unit 3 comprises two electrolytic devices 12, a desalination unit 11 and electrical equipment 16, such as control units or power converters. The safety system 20 is arranged at four different corners of the platform 45. The safety system 20 comprises a gas outlet 21 at each of the corners of the platform 45 where the safety system 20 is installed. The gas outlets 21 are arranged at an angular distance 24 with respect to the tower 41 of the wind turbine 40.

Figure 6:
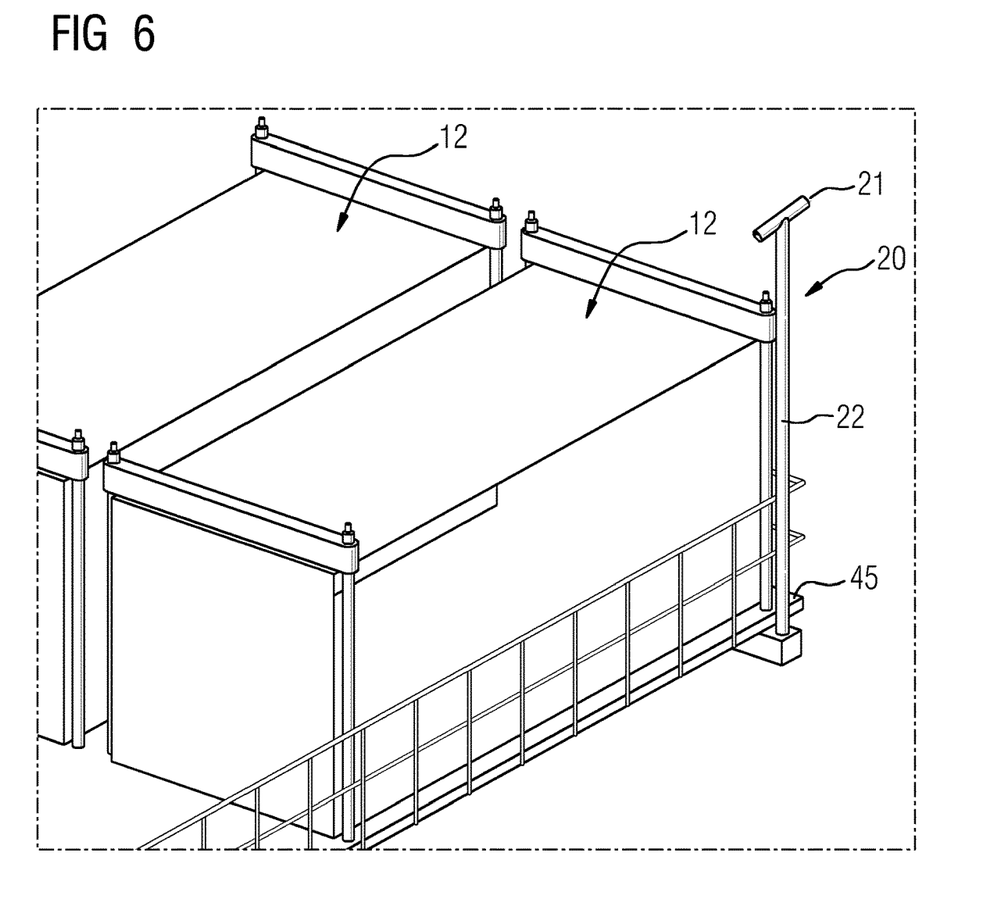
FIG. 6 shows a safety system comprising a chimney installed on a platform of a wind turbine.

FIG. 6 shows a safety system 20 comprising a chimney 22 installed on a platform 45 of a wind turbine 40. In this embodiment, the gas outlet 21 of the chimney 22 is higher than the containers roof carrying the electrolytic devices 12 so that wind can carry away the evacuated gases.

The chimney 22 shown here is fixed to the platform 45, but it could in principle also be fixed to the container. As illustrated here, the top of the chimney 22 has a gas outlet 21 which is slightly tilted relative to the horizontal direction with the highest point facing away from the platform 45, which ensures that the hydrogen 6 flows away from the platform 45.

Figure 7:
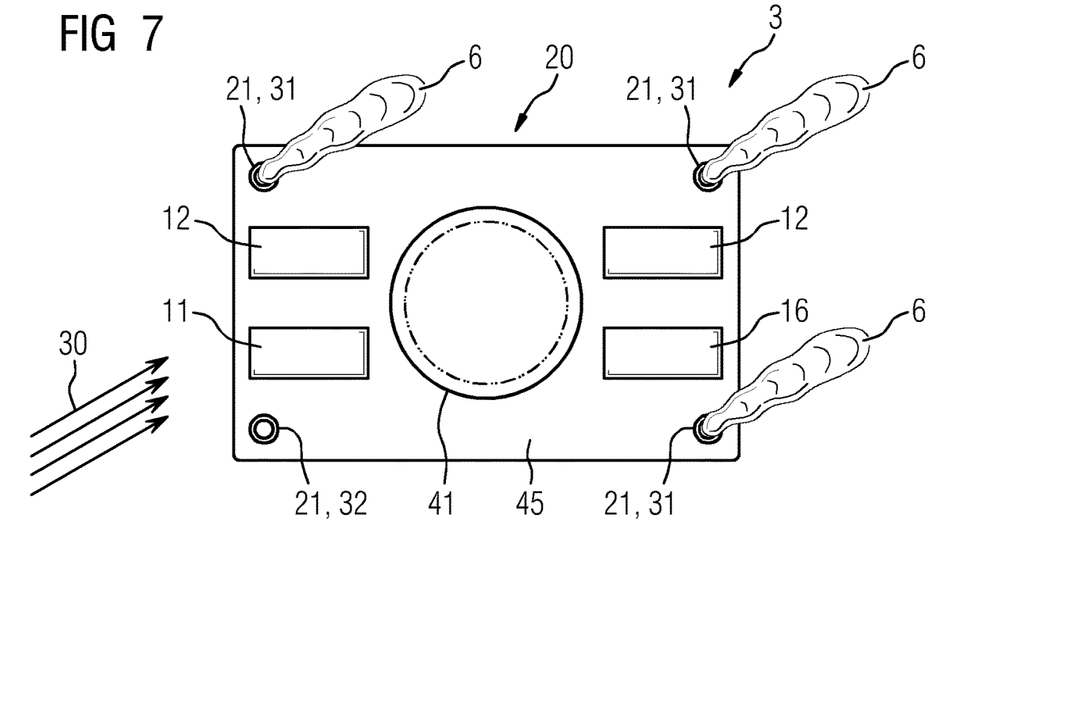
FIG. 7 shows the control of a safety system depending on the wind direction.
Figure 8:
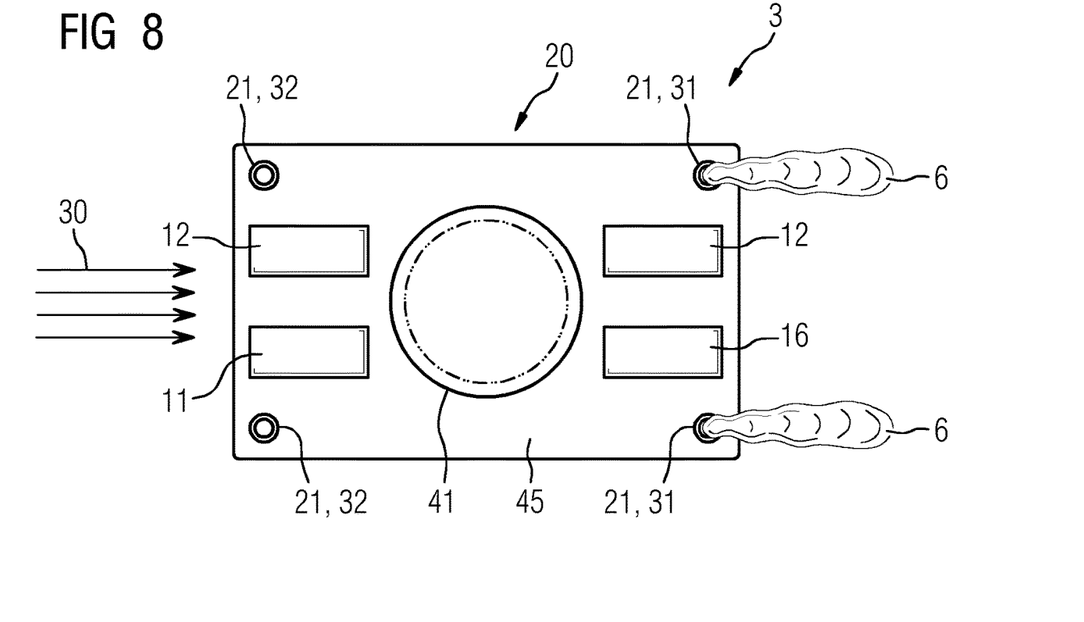
FIG. 8 shows the control of a safety system depending on the wind direction.

FIGS. 7 and 8 show the control of a safety system 20 depending on the wind direction 30. The gas outlets 21 of the safety system 20 in windward direction, i.e., directly facing the wind 30 or which are reached by the wind 30 on the first place, are closed gas outlets 32. The gas outlets 21 in leeward direction, i.e., the rest of the gas outlets 21 are opened gas outlets 31. This control strategy of gas outlets 21 helps to avoid that the hydrogen 6 evacuated by the opened gas outlets 31 expands over the platform 45 and therefore over electrical equipment, which may cause an explosion. It also reduces the risk of having explosive gas in the platform 45 area, where workers might be walking on.

Figure 9:
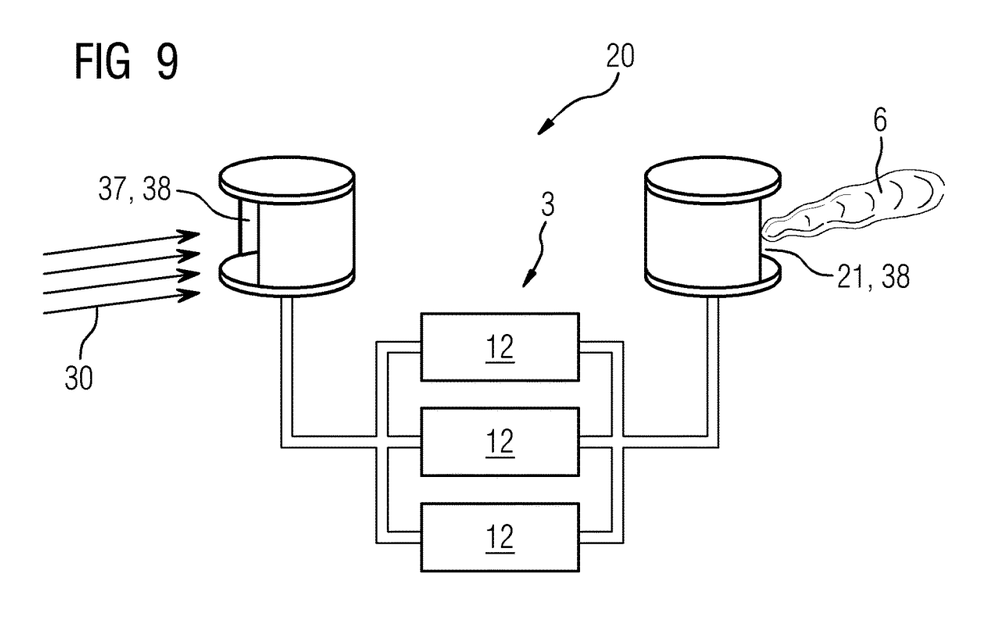
FIG. 9 shows a safety system coupled to a plurality of electrolytic devices.

FIG. 9 shows a safety system 20 coupled to a plurality of electrolytic devices 12. In contrast to the safety system 20 shown in FIGS. 7 and 8, the safety system 20 shown in FIG. 9 comprises funnels 38, which can work as an air inlet 37 if facing towards the wind 30 or as a gas outlet 21 to evacuate the hydrogen 6. The funnel 38 acting as an air inlet 37 collects the air coming from the wind 30 and transports the air through the electrolytic devices 12, thereby evacuating the electrolytic devices 12 from the hydrogen 6, which is then expelled from the electrolytic unit 3 at the gas outlets 21.

The funnels 38 can be rotatable to maximize the amount of wind 30 taken in by facing the opening of the funnel 38 towards the wind direction. Depending on the wind direction, the funnels 38 will collect the wind 30 as air inlets 37 or evacuate the hydrogen 6 as gas outlets 21.

A safety system 20 as shown in FIG. 9 can also be used in the setup as shown in FIGS. 7 and 8, i.e., having a funnel 38 at each corner of the platform 45, and following a similar control strategy to avoid that the hydrogen 6 stays at the platform 45 area.

Figure 10:
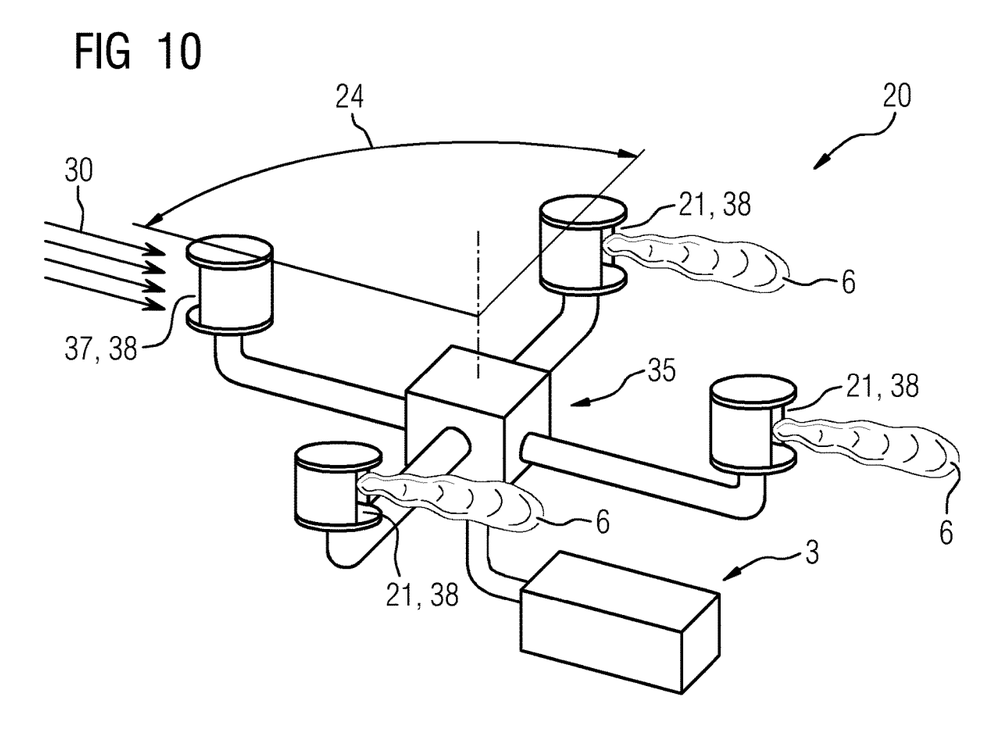
FIG. 10 shows a safety system coupled to a distributor system and to an electrolytic unit.

FIG. 10 shows a safety system 20 coupled to a distributor system 35 and to an electrolytic unit 3. In this case, the safety system 20 comprises four funnels 38 arranged at an angular distance 24 of 90° to the neighboring funnels 38. This angular distance 24 or a rectangular arrangement of the funnels 38, where each funnel 38 is arranged at the corner of the rectangle, is particularly useful for an efficient arrangement on the platform 45.

As shown here, the funnel 38 facing the wind 30 acts as an air inlet 37, collecting the air, which is transported to a distributor system 35, which distributes the air to each module of the electrolytic unit 3 containing hydrogen 6 and evacuates the electrolytic unit 3 from the hydrogen 6. The hydrogen 6 is then released to the atmosphere by the rest of the funnels 38 through the gas outlets 21.

A safety system 20 as shown in FIG. 10 can also be used in the setup as shown in FIGS. 7 and 8, i.e., having a funnel 38 at each corner of the platform 45, and following a similar control strategy to avoid that the hydrogen 6 stays at the platform 45 area.

Figure 11:
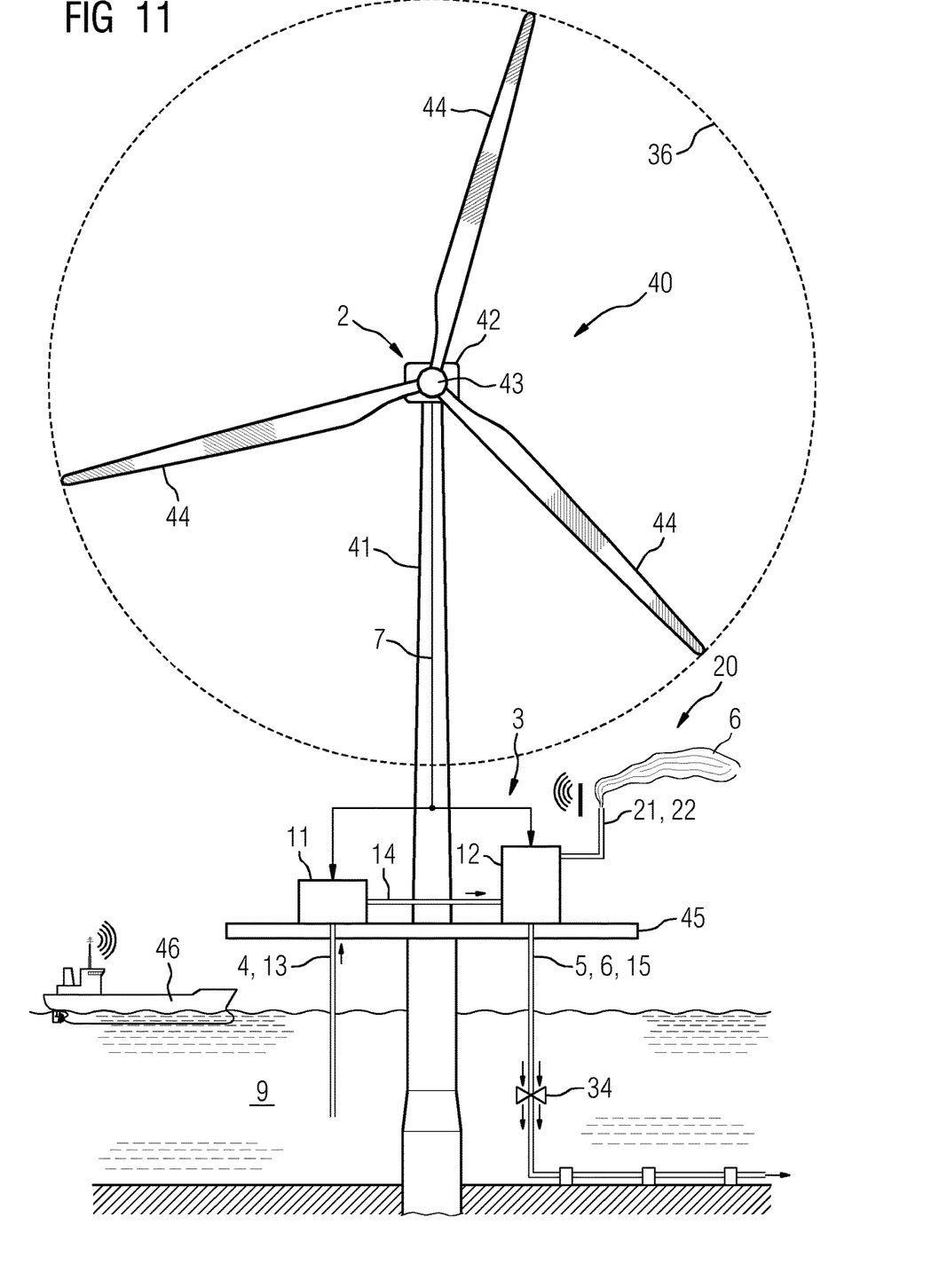
FIG. 11 shows a control strategy of a safety system.

FIG. 11 shows a control strategy of a safety system 20. Triggered by the approach of a vessel 46 to the wind turbine 40 location, the electrolytic unit 3 of the wind turbine 40 is automatically evacuated. The safety system 20 can also be triggered manually by a signal. The safety system 20 shown here comprises both a chimney 22 and a gas outlet 21 to release the hydrogen 6 to the atmosphere, as well as a gas outlet valve 34 at the system outlet 5 to bring the hydrogen 6 through a piping network to the onshore location. Releasing the hydrogen 6 at the swept area 36 of the blades 44 should be avoided. In an embodiment, if not enough wind 44 is available to carry the hydrogen 6 away, then instead of releasing the hydrogen 6 to the atmosphere, the hydrogen 6 can be evacuated through the gas outlet valve 34.

Additionally, the electrolytic unit 3 can be depressurized with a vacuum to ensure that the hydrogen 6 is completely evacuated. The electrolytic unit 3 can alternatively be flushed with air or other non-explosive gases, such as CO2 or halon-based gases commonly used in fire protection.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

2 Generator
3 Electrolytic unit
4 System inlet
5 System outlet
6 Hydrogen
7 Electric connection
8 Electricity grid
9 Input fluid
10 Power controlling device
11 Desalination unit
12 Electrolytic device
13 Saltwater input
14 Desalinated water
15 Hydrogen output
16 Electrical equipment
20 Safety system
21 Gas outlet
22 Chimney
23 System outlet valve
24 Angular distance
30 Wind
31 Opened gas outlet
32 Closed gas outlet
34 Gas outlet valve
35 Distributor system
36 Swept area
37 Air inlet
38 Funnel
40 Wind turbine
41 Tower
42 Nacelle
43 Hub
44 Blades
45 Platform
46 Vessel

The invention claimed is:

1. A wind turbine comprising:
a generator;
a system inlet;
a system outlet;
an electrolytic unit electrically powered by the generator to produce hydrogen from an input fluid, wherein the hydrogen produced can be taken out of the wind turbine by the system outlet; and
a safety system controlled by a control unit configured to evacuate the hydrogen out of the wind turbine by a plurality of gas outlets distributed on a platform of the wind turbine and configured to release the hydrogen to the atmosphere; wherein the control unit controls the flow through the gas outlets depending on whether a gas outlet is located at a windward direction or at a leeward direction with respect to the platform for avoiding that the hydrogen spreads over a region of the platform,
wherein the gas outlets comprise a funnel with an opening, the opening of the funnel being configured as an air inlet for introducing air into the electrolytic unit and enhancing an evacuation of the hydrogen.

2. The wind turbine according to claim 1, wherein the gas outlets in the windward direction are closed and at least one of the gas outlets in the leeward direction is opened.

3. The wind turbine according to claim 1, wherein the control unit controls the gas outlets in such a way that the funnel in the windward direction with respect to the platform act as an air inlet, further wherein the hydrogen is evacuated through at least one of the gas outlets in the leeward direction.

4. The wind turbine according to claim 1, wherein at least one gas outlet is arranged at an upper part of a chimney.

5. The wind turbine according to claim 1, wherein the hydrogen can be evacuated through the system outlet by a pump or by opening a system outlet valve.

6. The wind turbine according to claim 5, wherein the safety system is configured to release an overpressure in the electrolytic unit by opening the system outlet valve or by releasing the hydrogen to the atmosphere through one of the plurality of gas outlets.

7. The wind turbine according to claim 1, wherein the safety system comprises a fan configured to enhance a transport of the evacuated hydrogen away from the platform.

8. The wind turbine according to claim 1, wherein the gas outlets are rotatable and configured to be aligned with a wind direction.

9. The wind turbine according to claim 1, wherein the safety system comprises a distributor system for collecting the hydrogen.

10. A method of operating a wind turbine according to claim 1, the method comprising:
opening at least one of the gas outlets; and
releasing the hydrogen to the atmosphere through the at least one gas outlet.

11. The method of operating a wind turbine according to claim 10, the method comprising:
detecting a wind direction before opening at least one of the gas outlets;
leaving the gas outlets in the windward direction with respect to the platform closed; and
opening at least one of the gas outlets in the leeward direction.

12. The method of operating a wind turbine according to claim 10, the method further comprising:
detecting the wind direction before opening at least one of the gas outlets;
opening at least one of the gas outlets comprising the funnel in the windward direction with respect to the platform in such a way that the funnel in the windward direction acts as an air inlet; and
opening at least one of the gas outlets in the leeward direction so that the hydrogen is evacuated.

13. The method of operating a wind turbine according to claim 10, wherein the hydrogen evacuation process is triggered automatically by an approach of a vessel to the wind turbine.

* * * * *